(12) United States Patent
Kimura et al.

(10) Patent No.: US 7,709,588 B2
(45) Date of Patent: May 4, 2010

(54) CURABLE COMPOSITION

(75) Inventors: Yuuji Kimura, Kamisu (JP); Tatsuhiro Futami, Kamisu (JP); Hideaki Tanaka, Kamisu (JP); Genichirou Enna, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/146,708

(22) Filed: Jun. 26, 2008

(65) Prior Publication Data

US 2008/0269392 A1    Oct. 30, 2008

Related U.S. Application Data

(63) Continuation of application No. PCT/JP2006/325643, filed on Dec. 22, 2006.

(30) Foreign Application Priority Data

Dec. 26, 2005    (JP) .............................. 2005-372292

(51) Int. Cl.
   C08G 77/22    (2006.01)
   C08G 65/00    (2006.01)
(52) U.S. Cl. ........................ 528/30; 525/403
(58) Field of Classification Search ................. 524/421; 528/30
   See application file for complete search history.

(56) References Cited

U.S. PATENT DOCUMENTS

| | | | |
|---|---|---|---|
| 4,788,254 A * | 11/1988 | Kawakubo et al. .......... 525/100 |
| 4,906,719 A * | 3/1990 | Chu et al. ...................... 528/17 |
| 4,910,255 A * | 3/1990 | Wakabayashi et al. ...... 525/100 |
| 4,923,927 A * | 5/1990 | Hirose et al. ................. 525/100 |
| 4,963,626 A * | 10/1990 | Hirose et al. ................. 525/403 |
| 4,977,228 A * | 12/1990 | Wakabayashi et al. ........ 528/12 |
| 5,011,900 A * | 4/1991 | Yukimoto et al. ............ 525/477 |
| 5,068,304 A | 11/1991 | Higuchi et al. |
| 5,109,064 A * | 4/1992 | Wakabayashi et al. ...... 525/100 |
| 5,223,583 A | 6/1993 | Higuchi et al. |
| 5,296,582 A * | 3/1994 | Fujita et al. .................... 528/27 |
| 6,207,766 B1 | 3/2001 | Doi et al. |
| 6,369,187 B1 * | 4/2002 | Fujita et al. .................... 528/29 |
| 6,576,733 B1 * | 6/2003 | Fujita et al. .................... 528/18 |
| 6,780,934 B2 | 8/2004 | Doi et al. |
| 7,115,695 B2 * | 10/2006 | Okamoto et al. .............. 528/14 |
| 7,176,269 B2 * | 2/2007 | Hakuta et al. ................. 528/34 |
| 7,351,782 B2 * | 4/2008 | Wakabayashi et al. ........ 528/18 |
| 2004/0127631 A1 * | 7/2004 | Kanamori et al. ........... 524/523 |
| 2004/0214950 A1 * | 10/2004 | Nakamura et al. ............ 525/88 |

FOREIGN PATENT DOCUMENTS

| | | |
|---|---|---|
| JP | 53-129247 | 11/1978 |
| JP | 1-188557 | 7/1989 |
| JP | 2-189364 | 7/1990 |
| JP | 3-47825 | 2/1991 |
| JP | 3-72527 | 3/1991 |
| JP | 10-245482 | 9/1998 |
| JP | 2000-129147 | 5/2000 |

OTHER PUBLICATIONS

U.S. Appl. No. 12/348,544, filed Jan. 5, 2009, Kimura, et al.
U.S. Appl. No. 12/355,160, filed Jan. 16, 2009, Kimura, et al.
U.S. Appl. No. 09/694,501, filed Oct. 24, 2000, Doi, et al.

* cited by examiner

Primary Examiner—Randy Gulakowski
Assistant Examiner—Robert Loewe
(74) Attorney, Agent, or Firm—Oblon, Spivak, McClelland, Maier & Neustadt, L.L.P.

(57) ABSTRACT

To provide a hardly colored curable composition having an excellent storage stability while maintaining fast curing properties.

A curable composition which comprises a polymer (P) having a polyoxyalkylene chain and a group of the following formula (1) and a compound (S) having a mercapto group and a group of the following formula (2), and which contains from 0.01 to 0.50 part by mass of the compound (S) per 100 parts by mass of the polymer (P):

$$-Si(-X^1)_3 \quad (1)$$

$$-Si(-X^2)_m(-Y^2)_{3-m} \quad (2)$$

wherein symbols have the following meanings:
   $X^1$ and $X^2$: each independently a $C_{1-6}$ alkoxy group,
   $Y^2$: a $C_{1-6}$ alkyl group, and
   m: 1, 2 or 3.

15 Claims, No Drawings

CURABLE COMPOSITION

TECHNICAL FIELD

The present invention relates to a curable composition.

BACKGROUND ART

A curable composition comprising a polymer having a hydrolysable silicon group at an end of a polyoxyalkylene chain (also called as a modified silicone polymer), undergoes moisture-curing to form a cured product which is excellent in rubber elasticity. Therefore, the curable composition is widely used as an adhesive, a coating agent or a sealing material. Especially, a curable composition made of a polymer having a methyldimethoxysilyl group at an end of a polyoxyalkylene chain, is widely accepted in a market as a sealing material due to its excellent elastic physical property (Patent Document 1).

Further, a curable composition containing a polymer having a polyoxyalkylene chain and a trialkoxysilyl group, has a high curing rate and a high crosslink density, whereby it is useful as a fast curable adhesive, coating agent or sealing material (Patent Document 2).

The curable composition may be a curable composition comprising a specific polymer having a polyoxyalkylene chain and a trialkoxysilyl group bonded to the polyoxyalkylene chain terminal through a —OCH$_2$CH$_2$CH$_2$— or —SCH$_2$CH$_2$CH$_2$— group, or a specific polymer having a polyoxyalkylene chain and a trialkoxysilyl group bonded to the polyoxyalkylene chain terminal through an urethane bond, and a compound having an amino group and an alkoxysilyl group (Patent Document 3).

Patent Document 1: JP-A-03-072527
Patent Document 2: JP-A-03-047825
Patent Document 2: JP-A-10-245482

DISCLOSURE OF THE INVENTION

Object to be Accomplished by the Invention

However, the curable composition in Patent Document 2, had a high reactivity of a polymer having a polyoxyalkylene chain and a trialkoxysilyl group, whereby stability was low. Therefore, when the curable composition was to be stored, it was necessary to take a step to suppress an increase of viscosity of the curable composition by curing over time, and its handling was complex. The curable composition in Patent Document 3 was still not sufficient to satisfy both stability and fast curing properties.

Further, depending on the type of the polymer, a curable composition may be colored during the production, storage or curing reaction, by a reaction of the polymer or by a reaction with a trace component contained in the polymer, or with other additives such as an ultraviolet absorber or an antioxidant. Such tendency was particularly noticeable with a composition comprising a polymer obtained by a urethane-forming reaction of a polymer having a polyoxyalkylene chain and a hydroxyl group with a compound having an isocyanate group. In the particular technical field, a polymer is required to be as colorless as possible in order to improve the appearance of a cured product of a curable composition.

That is, a curable composition having excellent storage stability while maintaining fast curing properties, was needed. Moreover, a curable composition having excellent storage stability while maintaining fast curing properties and having little coloration, was needed.

Means to Accomplish the Object

The present inventors have conducted extensive studies, and as a result, they have found that a curable composition comprising a specific polymer having a polyoxyalkylene chain and a trialkoxysilyl group, and a specific amount of a compound having a mercapto group and an alkoxysilyl group, has excellent fast curing properties and stability.

Namely, the present invention provides the following.
(1) A curable composition which comprises a polymer (P) having a polyoxyalkylene chain and a group of the following formula (1), and a compound (S) having a mercapto group and a group of the following formula (2), and which contains from 0.01 to 0.50 part by mass of the compound (S) per 100 parts by mass of the polymer (P):

wherein symbols have the following meanings:
$X^1$ and $X^2$: each independently a $C_{1-6}$ alkoxy group,
$Y^2$: a $C_{1-6}$ alkyl group, and
m: 1, 2 or 3.

(2) The curable composition according to the above (1), wherein the polymer (P) is a polymer (P1) obtained by an urethane-forming reaction of a polymer (pP) having a polyoxyalkylene chain and a hydroxy group, with a compound (U) having a group of the following formula (1) and an isocyanate group, and in the urethane-forming reaction, the ratio of the total number of isocyanate groups in the compound (U) to the total number of hydroxy groups in the polymer (pP) is from 0.80 to 1.50:

wherein symbol has the following meaning:
$X^1$: a $C_{1-6}$ alkoxy group.

(3) The curable composition according to the above (2), wherein the compound (U) is a compound of the following formula (U1):

wherein symbols have the following meanings:
$X^1$: a $C_{1-6}$ alkoxy group, and
$Q^U$: a $C_{1-20}$ divalent organic group.

(4) The curable compound according to any one of the above (1) to (3), wherein the compound (S) is a compound of the following formula (S1):

wherein symbols have the following meanings:
$X^2$: a $C_{1-6}$ alkoxy group,
$Y^2$: a $C_{1-6}$ alkyl group,
m: 1, 2 or 3, and
$Q^M$: a $C_{1-20}$ divalent organic group.

(5) The curable composition according to any one of the above (1) to (4), which further contains a compound of is the following formula (V):

wherein symbols have the following meanings:
$X^3$: a $C_{1-6}$ alkoxy group,
$Y^3$: a $C_{1-6}$ hydrocarbon group, and
n: 1, 2, 3 or 4.

(6) A curable composition which comprises a polymer (P) having a polyoxyalkylene chain and a group of the following formula (1), a compound (S) having a mercapto group and a group of the following formula (2), and an antioxidant (T), and which contains from 0.01 to 0.50 part by mass of the compound (S) and from 0.01 to 10 parts by mass of the antioxidant (T), per 100 parts by mass of the polymer (P):

$$—Si(—X^1)_3 \quad (1)$$

$$—Si(—X^2)_m(—Y^2)_{3-m} \quad (2)$$

wherein symbols have the following meanings:
$X^1$ and $X^2$: each independently a $C_{1-6}$ alkoxy group,
$Y^2$: a $C_{1-6}$ alkyl group, and
m: 1, 2 or 3.

(7) A curable composition which is a curable composition obtained by adding and mixing an antioxidant (T) to a polymer (P) having a polyoxyalkylene chain and the group of the following formula (1), and then adding and mixing a compound (S) having a mercapto group and a group of the following formula (2) thereto, and which contains from 0.01 to 0.50 part by mass of the compound (S) and from 0.01 to 10 parts by mass of the antioxidant (T), per 100 parts by mass of the polymer (P):

$$—Si(—X^1)_3 \quad (1)$$

$$—Si(—X^2)_m(—Y^2)_{3-m} \quad (2)$$

wherein symbols have the following meanings:
$X^1$ and $X^2$: each independently a $C_{1-6}$ alkoxy group,
$Y^2$: a $C_{1-6}$ alkyl group, and
m: 1, 2 or 3.

(8) The curable composition according to the above (6) or (7), which has a chromaticity of less than 100.

(9) An adhesive or sealing material using the curable composition as defined in any one of the above (1) to (8).

EFFECTS OF THE INVENTION

According to the present invention, it is possible to form a cured product having excellent tensile strength and tacking-free characteristics, and it is possible to provide a curable composition having fast curing properties and storage stability.

The curable composition of the present invention is useful as e.g. an adhesive for various applications.

Although the polymer having a polyoxyalkylene chain and a hydroxyl group, and the polymer obtained by a urethane-forming reaction of a compound having an isocyanate group, are used, coloration does not occur during the storage or curing reaction, and the cured product will be excellent in appearance.

BEST MODE FOR CARRYING OUT THE INVENTION

In the present specification, a group of the formula (1) is referred to as the group (1). The same applies to other groups. Further, a number average molecular weight is referred to as Mn, a weight average molecular weight as Mw, and a molecular weight distribution as Mw/Mn.

The polymer in the present invention is a polymer having a polyoxyalkylene chain and the following group (1):

$$—Si(—X^1)_3 \quad (1)$$

In the present invention, one type of the polymer (P) may be used alone, or two or more types of such polymer (P) may be used.

$X^1$ in the group (1) is preferably a methoxy group, an ethoxy group, a propoxy group, a butoxy group, a pentyloxy group or a hexyloxy group, and the methoxy group is particularly preferred. Three $X^1$s in the group (1) may be the same or different groups, and they are preferably the same groups.

The group (1) is preferably a group bonded to a polyoxyalkylene chain terminal through a divalent connecting group (preferably a divalent organic group having 1 to 20 carbon atoms).

The polyoxyalkylene chain in the polymer (P) comprises preferably oxyalkylene-polymerized units formed by ring-opening polymerization of a $C_{2-6}$ alkylene oxide, more preferably oxyalkylene-polymerized units formed by ring-opening polymerization of at least one alkylene oxide selected from a group consisting of ethylene oxide, propylene oxide, butylenes oxide and hexylene oxide, particularly preferably oxyalkylene-polymerized units formed by ring-opening polymerization of propylene oxide. When a polyoxyalkylene chain comprises two or more types of oxyalkylene-polymerized units, the arrangement of two or more types of the polymerized units, may be in a block form or a random form.

Mn of the polymer (P) is preferably from 5,000 to 30,000, particularly preferably from 8,000 to 25,000. Further, Mw/Mn of the polymer (P) is preferably at most 3.0, more preferably at most 1.6, particularly preferably at most 1.5.

The polymer (P) is preferably a polymer (P1) obtained by the following method 1, a polymer (P2) obtained by the following method 2 or a polymer (P3) obtained by the following method 3, and from the viewpoint of availability, it is particularly preferably a polymer (P1).

Method 1: A method to carry out a urethane-forming reaction of a polymer (pP) having a polyoxyalkylene chain and a hydroxyl group with a compound (U) having the group (1) and an isocyanate group.

Method 2: A method to carry out an addition reaction of a polymer (aP) having a polyoxyalkylene chain and an alkenyl group (hereinafter referred to as polymer (aP)) with a compound (M) having the group (1) and a mercapto group (hereinafter referred to as compound (M)).

Method 3: A method to carry out a hydrosilylation reaction of a polymer (aP) with a compound of a formula Si(—H)(—X$^1$)$_3$.

The polymer (pP) in the method 1 is preferably a polymer (pP1) obtained by ring-opening polymerization of an alkylene oxide with a compound having an active hydrogen atom, in the presence of a double metal cyanide complex (zinc hexacyanocobaltate is preferred).

The double metal cyanide complex is preferably a double metal cyanide complex having an organic ligand.

The organic ligand is preferably an etheric type ligand or an alcohol type ligand.

Specific examples for the etheric type ligand may be ethylene glycol dimethyl ether (glyme), diethylene glycol dimethyl ether (diglyme) and triethylene glycol dimethyl ether.

Specific examples for the alcohol type ligand may be tert-butyl alcohol, n-butyl alcohol, sec-butyl alcohol, iso-butyl alcohol, tert-pentyl alcohol, iso-pentyl alcohol and ethylene glycol mono-tert-butyl ether.

The compound having an active hydrogen atom may be used alone or two or more such compounds may be used in combination as a mixture. The compound having an active hydrogen atom is preferably an organic compound having an active hydrogen atom, more preferably a compound having a hydroxyl group or an amino group, particularly preferably a compound having from 1 to 4 hydroxyl groups.

Specific examples for the organic compound having an active hydrogen atom may be ethylene glycol, propylene glycol, dipropylene glycol, butane diol, hexamethylene glycol, hydrogenated bisphenol A, neopentyl glycol, polybutadiene glycol, diethylene glycol, triethylene glycol, polyethylene glycol, allyl alcohol, methallyl alcohol, glycerol, trimethylol methane, trimethylol propane and pentaerythritol. Further, it may, for example, be at least one polymer-form alcohol having Mn of from 300 to 1,500, selected from a group consisting of polyoxypropylene monool, polyoxypropylene diol, polyoxypropylene triol, polyoxyethylene monool, polyoxyethylene diol and polyoxyethylene triol.

When using two or more compounds having active hydrogen atoms, it is preferred to use a polymer-form alcohol having two hydroxyl groups, and a polymer-form alcohol having three hydroxyl groups.

In the method 1, the urethane-forming reaction with a compound (U) may be carried out after a double metal cyanide complex contained as a polymerization residue, is removed by purification, or the urethane-forming reaction with the compound (U) may be carried out without removing the double metal cyanide complex by purification.

It is considered that the double metal cyanide complex functions not only as a catalyst for the ring-opening polymerization, but also as a catalyst for the urethane-forming reaction. Therefore, when the urethane-forming reaction of a polymer (pP1) with a compound (U) is carried out without removing a double metal cyanide complex contained in the polymer (pP1) as a polymerization residue, by purification, there is an effect such that the urethane-forming reaction efficiently proceeds.

In the method 1, in the urethane-forming reaction, the ratio of a total number of isocyanate groups of the compound (U) to a total number of hydroxyl groups in the polymer (pP1) (isocyanate groups/hydroxyl groups), is preferably from 0.80 to 1.05, particularly preferably from 0.85 to 1.00. In such a range, there will be an effect such that fast curing properties and storage stability of a curable composition will be remarkably improved.

The reason is not necessarily apparent, but it is considered that in such a range, even if a hydroxyl group remains in the obtained polymer (P1), a crosslinking reaction of the hydroxyl group with the group (1) in the polymer (P1), is suppressed, and the viscosity of the curable composition tends to hardly increase. Further, it is considered that a side reaction (such as an allophanate-forming reaction or an isocyanurate-forming reaction) in the urethane-forming reaction, is suppressed, whereby the group (1) tends to be hardly formed by the side reaction, and the viscosity of a curable composition tends to hardly increase.

In the method 1, the urethane-forming reaction may be carried out in the presence of a urethane-forming catalyst. The urethane-forming catalyst is not particularly limited, and a metal catalyst such as an organic tin compound (such as dibutyltin diacetate, dibutyltin dilaurate or dioctyltin dilaurate) or a bismuth compound, or a basic catalyst such as an organic amine, is used. The reaction temperature is at a level of preferably from 20 to 200° C., particularly preferably from 50 to 150° C. Further, the urethane-forming reaction is preferably carried out in an atmosphere of an inert gas (nitrogen gas is preferred).

In the method 1, the compound (U) is not particularly limited, but the following compound (U1) is preferred.

$Q^U$ is preferably a $C_{1-20}$ divalent hydrocarbon group, more preferably a $C_{1-10}$ alkylene group, and from the viewpoint of availability, a trimethylene group is particularly preferred.

$X^1$ is preferably a methoxy group, an ethoxy group, a propoxy group, a butoxy group, a pentyloxy group or a hexyloxy group, particularly preferably a methoxy group.

Specific examples for the compound (U) may be 1-isocyanatomethyltrimethoxysilane, 2-isocyanatoethyltrimethoxysilane, 3-isocyanatopropyltrimethoxysilane, 3-isocyanatobutyltrimethoxysilane, 3-isocyanatopentyltrimethoxysilane, 1-isocyanatomethyltriethoxysilane, 2-isocyanatoethyltriethoxysilane, 3-isocyanatopropyltriethoxysilane, 3-isocyanatobutyltriethoxysilane, 3-isocyanatopentyltriethoxysilane, 1-isocyanatopropyltrimethoxysilane and 1-isocyanatopropyltriethoxysilane.

In the method 2 or 3, the polymer (aP) is preferably a polymer (a1P) having a polyoxyalkylene chain and an allyl group.

The polymer (a1P) is preferably a polymer obtained by forming the polymer (pP1) into an alcoholate in the presence of an alkali metal halide, followed by a reaction with an allyl halide. As the alkali metal hydroxide, sodium hydroxide or potassium hydroxide is preferred.

Now, the compound (S) in the present invention will be described in detail.

In the present invention, one type of the compound (S) may be used, or two or more types of the compound (S) may be used.

The compound (S) in the present invention is preferably the following compound (S1).

$X^2$ is preferably a methoxy group, an ethoxy group, a propoxy group, a butoxy group, a pentyloxy group or a hexyloxy group, particularly preferably a methoxy group.

m is preferably 2 or 3. When m is 2 or 3, the plurality of $X^2$ in the compound (S) may be the same or different, and preferably the same.

$Q^M$ in the compound (S1) is preferably a $C_{1-20}$ divalent hydrocarbon, more preferably a $C_{1-10}$ alkylene group, particularly preferably a trimethylene group.

$Y^2$ in the compound (S1) is preferably a methyl group, an ethyl group, a propyl group, a butyl group, a pentyl group or a hexyl group, particularly preferably a methyl group.

Specific examples for the compound (S) may be 3-mercaptopropyltrimethoxysilane, 3-mercaptopropyltriethoxysilane, 3-mercaptopropyltri-n-propoxysilane, 3-mercaptopropyltriisopropoxysilane, 3-mercaptopropyldimethoxyethoxysilane, 3-mercaptopropyl methoxydiethoxysilane, 3-mercaptopropylmethyldimethoxysilane, 3-mercaptopropylmethyldiethoxysilane, 3-mercaptopropylmethylmethoxyethoxysilane, 3-mercaptopropylmethyl-di-n-propoxysilane, 3-mercaptopropylmethyldiisopropoxysilane, 3-mercaptopropylethyldimethoxysilane, 3-mercaptopropylethyldiethoxysilane, 3-mercaptopropylethyl-di-n-propoxysilane, 3-mercaptopropyldimethylmethoxysilane, 3-mercaptopropyldimethylethoxysilane and 3-mercaptopropyldimethyl-n-propoxysilane.

The curable composition of the present invention contains the compound (S) having both a mercapto group and the following group (2), whereby it has excellent fast curing properties and storage stability. Especially, it was unexpected that the curable composition containing the compound (S) of the present invention had effects for improving storage stability, which were not observed with a curable composition containing a compound having only a mercapto group.

$$—Si(—X^2)_m(—Y^2)_{3-m} \quad (2)$$

Symbols in the above formula (2) have the same meanings as in the compound (S1).

The curable composition of the present invention contains from 0.01 to 0.50 part by mass of the compound (S) per 100 parts by mass of the polymer (P). Therefore, the curable composition of the present invention has excellent fast curing properties and storage stability.

The reason is not necessarily apparent, but it is considered that the compound (S) suppresses a crosslinking reaction by a hydrolysis reaction with time of the polymer (P) by impurities (such as polymerization residues or unreacted components contained in the polymer (P)) in the curable composition.

For example, when the polymer (P) in the curable composition of the present invention is the polymer (P1) obtained by reacting the above polymer (pP1) and the compound (U) by an urethane-forming reaction, there is an effect such that storage stability of the curable composition will be remarkably improved.

The reason is not necessarily apparent, but it is considered that a mercapto group of the compound (S) deactivates a double metal cyanide complex which may possibly be contained in the polymer (pP1) as a polymerization residue, and a crosslinking reaction by a hydrolysis reaction with time of the polymer (P1) is remarkably suppressed.

Further, with respect to the polymer (P1) obtained by an urethane-forming reaction in the presence of an urethane catalyst, it is considered that by deactivating the urethane catalyst which may possibly contain a mercapto group of the compound (S) as a residue, the crosslinking reaction by a hydrolysis reaction with time of the polymer (P1) is remarkably suppressed.

The curable composition of the present invention contains preferably from 0.02 to 0.50 part by mass, particularly preferably from 0.03 to 0.50 part by mass, of the compound (S) per 100 parts by mass of the polymer (P). In such a range, particularly excellent storage stability and fast curing properties will be imparted to the curable composition.

In the present invention, by adding the compound (S) to the polymer (P), the curable composition may be obtained.

In such a case, it is preferred that the antioxidant (T) is added and mixed to the polymer (P), and then, the compound (S) is added and mixed thereto to obtain the curable composition.

The antioxidant (T) is contained preferably from 0.01 to 10 parts by mass, particularly preferably from 0.1 to 1 part by mass, per 100 parts by mass of the polymer (P).

In such a case, before adding the compound (S), it is important that the antioxidant (T) is added and sufficiently mixed. If the antioxidant (T) is added after the compound (S) is added, or if the compound (S) and the antioxidant (T) are added simultaneously and mixed, there will be no effect to suppress an increase of chromaticity of the curable composition after the production.

The antioxidant (T) is not particularly limited but is preferably a hindered phenol or a hindered amine, particularly preferably a hindered phenol. Further, two or more such antioxidants may be contained.

Such may, specifically, be pentaerythritol, tetrakis[3-(3,5-di-tert-butyl-4-hydroxyphenyl)propionate] (manufactured by Ciba Specialty Chemicals Inc., tradename: IRGANOX 1010), 6-methylheptyl-3-(3,5-di-tert-butyl-4-hydroxyphenyl)propionate (manufactured by Ciba Specialty Chemicals Inc., tradename: IRGANOX 1135) or octadecyl-3-(3,5-di-tert-butyl-4-hydroxyphenyl)propionate (manufactured by Ciba Specialty Chemicals Inc., tradename: IRGANOX 1076).

By adding and mixing the antioxidant (T) to the polymer (P) and then adding and mixing the compound (S) thereto, it is possible to obtain a curable composition having a low chromaticity. Further, with the curable composition obtained by such steps, the chromaticity can be maintained to be low after the storage.

The chromaticity of the obtained curable composition is preferably less than 100.

Further, the curable composition of the present invention preferably contains a compound of the following formula (V).

When the curable composition of the present invention contains the compound (V), there will be an effect such that fast curing properties and storage stability will be improved.

The reason is not necessarily apparent, but it is considered that a crosslinking reaction by a hydrolysis reaction with time of the polymer (P) is suppressed, by a preferential reaction of a hydrolytic silyl group in the compound (V), water which may possibly be contained in the curable composition and a hydroxyl group, etc. which may possibly be contained in the polymer (P).

$$Si(—X^3)_n(—Y^3)_{4-n} \quad (V)$$

In the above formula (V), n is preferably 3 or 4, more preferably 4.

$X^3$ is preferably a methoxy group, an ethoxy group, a propoxy group, a butoxy group, a pentyloxy group or a hexyloxy group, particularly preferably a methoxy group. Three $X^3$s in the compound (V) may be the same or different, preferably the same.

$Y^3$ is preferably a $C_{1-6}$ alkyl group or a $C_{1-6}$ alkenyl group, particularly preferably a methyl group, an ethyl group, a propyl group, a butyl group, a heptyl group, a hexyl group or a vinyl group.

Specific examples for the compound (V) may be methylmethoxysilane, methyltriethoxysilane, ethyltriethoxysilane, phenyltriethoxysilane, methyltriacetoxysilane, vinyltrimethoxysilane, tetramethyl orthosilicate (tetramethoxysilane or methyl silicate), tetraethyl orthosilicate, tetrapropyl orthosilicate and tetrabutyl orthosilicate.

When the curable composition of the present invention contains the compound (V), the compound (V) is contained preferably from 0.1 to 10 parts by mass, particularly preferably from 0.3 to 8 parts by mass, per 100 parts by mass of the polymer (P).

The curable composition of the present invention may further contain at least one additive selected from the group consisting of a curing catalyst, a filler, a plasticizer, an adhesion-promoting agent, a solvent, a dehydrating agent, a thixotropy-imparting agent, a stabilizing agent and a pigment.

In the present invention, the curing catalyst is not particularly limited as long as it is a compound to catalyze the crosslinking reaction by a hydrolysis reaction of the group (1) of the polymer (P) with the group (2) of the compound (S). Specific examples for the curing catalyst may be an organic tin compound, an organic metallic compound containing a metal other than tin, a metal organic alkoxide, a complex containing a metal other than tin, an organic amine and other catalysts.

Specific examples for the organic tin compound may be an organic tin carboxylate such as dibutyltin diacetate, dibutyltin dilaurate, dioctyltin dilaurate, $(n-C_4H_9)_2Sn(OCOCH=CHCOOCH_3)_2$, $(n-C_4H_9)_2Sn(OCOCH=CHCOO(n-C_4H_9))_2$, $(n-C_8H_{17})_2Sn$ (OCOCH=CHCOOCH$_3$)$_2$, (n-C$_8$H$_{17}$)$_2$Sn (OCOCH=CHCOO(n-C$_4$H$_9$))$_2$ or (n-C$_8$H$_{17}$)$_2$Sn (OCOCH=CHCOO(iso-C$_8$H$_{17}$))$_2$; an organic tin compound containing a sulfur atom such as (n-C$_4$H$_9$)$_2$Sn(SCH$_2$COO), (n-C$_8$H$_{17}$)$_2$Sn(SCH$_2$COO), (n-C$_8$H$_{17}$)$_2$Sn(SCH$_2$CH$_2$COO), (n-C$_8$H$_{17}$)$_2$Sn (SCH$_2$COOCH$_2$CH$_2$OCOCH$_2$S), (n-C$_4$H$_9$)$_2$Sn (SCH$_2$COO(iso-C$_8$H$_{17}$))$_2$, (n-C$_8$H$_{17}$)$_2$Sn(SCH$_2$COO(iso-C$_8$H$_{17}$))$_2$, (n-C$_8$H$_{17}$)$_2$Sn(SCH$_2$COO(iso-C$_8$H$_{17}$))$_2$ or (n-C$_4$H$_9$)$_2$SnS, (C$_8$H$_{17}$)$_2$Sn(SCH$_2$COOC$_8$H$_{17}$))$_2$; an organic tin oxide compound such as (n-C$_4$H$_9$)$_2$SnO or (n-C$_8$H$_{17}$)$_2$SnO; a reaction product obtained by a reaction of an organic tin oxide with an ester (such as ethyl silicate, dimethyl maleate, diethyl maleate, dioctyl maleate, dimethyl phthalate, diethyl phthalate or dioctyl phthalate); a chelate of an organic tin compound such as (n-C$_4$H$_9$)$_2$Sn(acac)$_2$, (n-C$_8$H$_{17}$)$_2$Sn (acac)$_2$, (n-C$_4$H$_9$)$_2$Sn(OC$_8$H$_{17}$)(acac), (n-C$_4$H$_9$)$_2$Sn(etac)$_2$, (n-C$_8$H$_{17}$)$_2$Sn(etac)$_2$, (n-C$_4$H$_9$)$_2$Sn (OC$_8$H$_{17}$)(etac) or tin bis-acetylacetonate; a reaction product obtained by a reaction of a chelate of the organic tin compound with an alkoxysilane (such as tetramethoxysilane, tetraethoxysilane or tetrapropoxysilane); and an organic tin compound having a —SnOSn-bond such as (n-C$_4$H$_9$)$_2$(CH$_3$COO)SnOSn (OCOCH$_3$)(n-C$_4$H$_9$)$_2$ or (n-C$_4$H$_9$)$_2$(CH$_3$O)SnOSn(OCH$_3$) (n-C$_4$H$_9$)$_2$; a divalent tin carboxylate such as tin 2-ethylhexanoate, tin n-octanoate, tin naphthenate or tin stearate. Here, acac refers to an acetylacetonate ligand, and etac refers to an ethyl acetoacetate ligand (the same applies hereinafter).

Specific examples for the organic metal compound containing a metal other than tin, may be a calcium carboxylate, a zirconium carboxylate, an iron carboxylate, a vanadium carboxylate, a bismuth carboxylate such as bismuth tris-2-ethylhexoate, a lead carboxylate, a titanium carboxylate and a nickel carboxylate.

Specific examples for the organic metal alkoxide may be a titanium alkoxide such as tetraisopropyl titanate, tetrabutyl titanate, tetramethyl titanate or tetra(2-ethyl hexyl titanate); an aluminum alkoxide such as aluminum isopropylate or mono-sec-butoxyaluminum diisopropylate; a zirconium alkoxide such as zirconium n-propylate or zirconium n-butylate; a titanium alkoxide such as titanium tetraacetylacetonate, titanium ethyl acetoacetate, titanium octylene glycolate and titanium lactate.

Specific examples for the complex containing a metal other than tin, may be an aluminum chelate such as aluminum trisacetylacetonate, aluminum trisethyl acetoacetate or diisopropoxyaluminum ethyl acetate; or a zirconium chelate such as zirconium tetraacetylacetonate, zirconium bisacetylacetonate, a zirconium acetylacetonate bisethyl acetoacetate or zirconium acetate.

Specific examples for the organic amine, may be an aliphatic monoamine such as butyl amine, hexyl amine, octyl amine, decyl amine, lauryl amine or triethyl amine; an aliphatic diamine such as ethylene diamine or hexane diamine; an aliphatic polyamine such as diethylene triamine, triethylene tetramine or tetraethylene pentamine; a heterocyclic amine such as piperidine or piperazine; an aromatic amine such as metaphenylene diamine; an alkanol amine such as monoethanol amine, diethanol amine or triethanol amine; and various modified amines to be used for curing epoxy resins.

Specific examples for other catalysts, may be phosphoric acid, p-toluene sulfonic acid and phthalic acid.

The curing catalyst is preferably the organic tin compound from the viewpoint of handling. From the viewpoint of fast curing properties, it is particularly preferably (n-C$_4$H$_9$)$_2$Sn (acac)$_2$, (n-C$_8$H$_{17}$)$_2$Sn(acac)$_2$, (n-C$_4$H$_9$)$_2$Sn(OC$_8$H$_{17}$)(acac), (n-C$_4$H$_9$)$_2$Sn(etac)$_2$ or (n-C$_8$H$_{17}$)$_2$Sn(etac)$_2$.

Further, it is possible to control the curing rate of the curable composition by properly selecting the curing catalyst. For example, it is possible to lower the curing rate of the curable composition of the present invention by selecting a low active catalyst as the curing catalyst.

A specific example for the low active catalyst, may be a specific organic tin compound containing a sulfur atom in a ligand (such as tradename: UL-29 manufactured by Crompton Corporation and tradename: NEOSTANN U-860 manufactured by NITTO KASEI CO., LTD.).

The curable composition of the present invention may contain one curing catalyst, or it may contain two or more curing catalysts. When two or more curing catalysts are contained, it is preferred to contain an organic tin compound and an organic amine, since the curable composition of the present invention will then have excellent curing properties.

The curable composition of the present invention preferably contains from 0.001 to 10 parts by mass of the curing catalyst per 100 parts by mass of the polymer (P). In such a case, there will be effects such that the curing rate becomes high, and foaming during curing is suppressed, whereby durability of the curable composition will be improved.

In the present invention, specific examples for the filler, may be calcium carbonate, silica, silicic anhydride, carbon black, magnesium carbonate, diatomaceous earth, clay, talc, titanium oxide, bentonite, ferric oxide, zinc oxide, charcoal, pulp, cotton chips, mica, walnut shell flour and rice hull flour.

The filler may be fine powder or fine hollow bodies (such as silica balloons, Shirasu balloons, glass balloons, or resin balloons). The curable composition of the present invention may contain one filler or two or more fillers.

The calcium carbonate is preferably a calcium carbonate which is surface-treated by an aliphatic acid or a resin acid. The calcium carbonate is preferably a colloidal calcium carbonate having an average particle size of at most 1 μm, a light calcium carbonate having an average particle size of from 1 to 3 μm or a heavy calcium carbonate having an average particle size of from 1 to 20 μm.

The curable composition of the present invention contains preferably at most 1000 parts by mass, particularly preferably from 50 to 250 parts by mass, of the filler, per 100 parts by mass of the polymer (P).

In the present invention, the plasticizer may, for example, be a phthalate such as dioctyl phthalate, dibutyl phthalate or butyl benzene phthalate; an aliphatic carboxylate such as dioctyl adipate, bis(2-methyl nonyl)succinate, dibutyl sebacate or butyl oleate; an alcohol ester such as pentaerythritol ester; a phosphate such as trioctyl phosphate or tricresyl phosphate; an epoxy type plasticizer such as epoxidized soybean oil, dioctyl 4,5-epoxyhexahydrophthalate or benzyl epoxystearate; a chlorinated paraffin; a polyester type plasticizer obtained by reacting a dibasic acid with a dihydric alcohol; a polyether type plasticizer such as polyoxypropylene glycol; a styrene type plasticizer such as poly-α-methyl styrene or polystyrene; a polymeric plasticizer such as polybutadiene, a butadiene-acrylonitrile copolymer, polychloroprene, polyisoprene, polybutene, hydrogenated polybutene or epoxidized polybutadiene.

The curable composition of the present invention contains preferably at most 1,000 parts by mass, particularly preferably from 1 to 100 parts by mass, of the plasticizer, per 100 parts by mass of the polymer (P).

Specific examples for the adhesion-promoting agent in the present invention may be an organic silane coupling agent such as a silane having a (meta)acryloyloxy group, a silane having an amino group, a silane having an epoxy group or a silane having a carboxyl group; an organic metal coupling agent such as isopropyl tri(N-aminoethyl-aminoethyl)propyltrimethoxy titanate or 3-mercaptopropyltrimethoxy titanate; and an epoxy resin.

Specific examples for the silane having a (meta)acryloyloxy group may be 3-metacryloyloxy propyl trimethoxysilane, 3-acryloyloxy propyl trimethoxysilane and 3-metacryloyloxy propyl methyl dimethoxysilane.

Specific examples for the silane having an amino group may be 3-aminopropyl trimethoxysilane, 3-aminopropyl triethoxysilane, 3-aminopropyl methyl dimethoxysilane, N-(2-aminoethyl)-3-aminopropyl trimethoxysilane, N-(2-aminoethyl)-3-aminopropyl methyl dimethoxysilane, N-(2-aminoethyl)-3-aminopropyl triethoxysilane, 3-ureidopropyl triethoxysilane, N—(N-vinyl benzyl-2-aminoethyl)-3-aminopropyl trimethoxysilane and 3-anilinopropyl trimethoxysilane.

Specific examples for the silane having an epoxy group may be 3-glycidyloxypropyltrimethoxysilane, 3-glycidyloxypropyl methyl dimethoxysilane and 3-glycidyloxypropyltriethoxysilane.

Specific examples for the silane having a carboxyl group may be 2-carboxyethyl triethoxysilane, 2-carboxyethylphenyl bis(2-methoxyethoxy)silane and N—(N-carboxylmethyl-2-aminoethyl) 3-aminopropyltrimethoxysilane.

Further, a reaction product obtained by reacting two or more silane coupling agents, may be used. The reaction product may, for example, be a reaction product obtained by reacting the silane having an amino group with the silane having an epoxy group; a reaction product obtained by reacting the silane having an amino group with the silane having a (meta)acryloyloxy group; a reaction product obtained by reacting the silane having an epoxy group with the silane having a mercapto group; a reaction product obtained by reacting silanes having different mercapto groups.

Specific examples for the epoxy resin may be a bisphenol A-diglycidyl ether type epoxy resin, a bisphenol F-diglycidyl ether type epoxy resin, a tetrabromobisphenol A-glycidyl ether type epoxy resin, a novolak type epoxy resin, a hydrogenated bisphenol A type epoxy resin, a glycidyl ether type epoxy resin of bisphenol A-propylene oxide adduct, a glycidyl 4-glycidyloxy benzoate, a diglycidyl phthalate, a diglycidyl tetrahydrophthalate, a diglycidyl hexahydrophthalate, a diglycidylester type epoxy resin, a m-aminophenol type epoxy resin, a diaminodiphenyl methane type epoxy resin, an urethane modified epoxy resin, a N,N-diglycidyl aniline, a N,N-diglycidyl-o-toluidine, a triglycidyl isocyanurate, a polyalkylene glycol diglycidyl ether, a glycidyl ether of polyhydric alcohol (such as glycerol), a hydantoin type epoxy resin and an unsaturated polymer (such as petroleum).

When the curable composition of the present invention contains the above silane coupling agent, the silane coupling agent is contained preferably from more than 0 to 30 parts by mass per 100 parts by mass of the polymer (P).

When the curable composition of the present invention contains the above epoxy resin, the epoxy resin is contained preferably at most 100 parts by mass per 100 parts by mass of the polymer (P).

In the present invention, specific examples for the solvent may be an aliphatic hydrocarbon, an aromatic hydrocarbon, a halogenated hydrocarbon, an alcohol, a ketone, an ester, an ether, an ester alcohol, a ketone alcohol, an ether alcohol, a ketone ether, a ketone ester and an ester ether.

When the alcohol is used, the storage stability of the curable composition will be improved. The alcohol is preferably a $C_{1-10}$ alkyl alcohol, more preferably methanol, ethanol, isopropanol, isopentyl alcohol or hexyl alcohol, particularly preferably methanol or ethanol.

When the curable composition of the present invention contains the solvent, the solvent is contained preferably at most 500 parts by mass per 100 arts by mass of the polymer (P).

In the present invention, specific examples for the dehydrating agent may be a trialkyl orthoformate such as trimethyl orthoformate, triethyl orthoformate, tripropyl orthoformate or tributyl orthoformate; and a trialkyl orthoacetate such as trimethyl orthoacetate, triethyl orthoacetate, tripropyl orthoacetate or tributyl orthoacetate.

When the curable composition of the present invention contains the dehydrating agent, the dehydrating agent is contained preferably from 0.001 to 30 parts by mass per 100 parts by mass of the polymer (P).

In the present invention, specific examples for the thixotropy-imparting agent may be a hydrogenated castor oil and an aliphatic amide.

In the present invention, a stabilizing agent other than the above antioxidant (T), may be used. Specifically, an ultraviolet absorber or a light stabilizer may be mentioned.

Specific examples for the stabilizer may be an age resistor of a benzotriazole type, a benzophenol type, a benzoate type, a cyanoacrylate type, an acrylate type, a phosphorus type and a sulfur type.

In the present invention, specific examples for the pigment may be an inorganic pigment such as iron oxide, chrome oxide or titanium oxide; and an organic pigment such as phthalocyanine blue or phthalocyanine green.

The method for producing the curable composition of the present invention is not particularly limited. For example, there is a method wherein from 0.01 to 0.50 parts by mass of the compound (S) is mixed with 100 parts by mass of the polymer (P).

When the curable composition of the present invention contains other components (such as the compound (V), the above curing catalyst, the above filler, the above adhesion-promoting agent, the above solvent, the above thixotropy-imparting agent, the above stabilizer (age resistor) and the above pigment) (hereinafter referred to as other components), the order of blending such other components is not particularly limited, but it is preferred to mix the curable composition of the present invention with such other components except for the curing catalyst, and then mixing the curing catalyst thereto.

Further, the curing method for the curable composition of the present invention is not particularly limited, but it is preferred to use a curing method for a one-pack type curable composition wherein the curable composition of the present invention is mixed with desired other components, sealed and stored, and at the time of its use, the mixture is cured by moisture in the air, or a curing method for a two-pack type curable composition wherein the curable composition of the present invention and the desired other components are mixed and properly cured when they are to be used.

The curable composition of the present invention is capable of forming a cured product having high curing properties and storage stability and having good mechanical properties.

As a curable composition for covering and sealing, the curable composition of the present invention is useful as a sealant for building, a waterproof material, an adhesive, a sealing material or a coating agent. It is particularly useful as an adhesive.

A preferred application for using the adhesive made of the curable composition of the present invention is a one-pack type curable adhesive wherein the curable composition of the present invention is mixed with desired other components, sealed and stored, and at the time of its use, the adhesive is cured by moisture in the air, or a two-pack type curable adhesive wherein the curable composition of the present invention and the desired other components are mixed and cured when they are to be used.

EXAMPLES

Now, the present invention will be described in further detail with reference to Examples, but it should be understood that the present invention is by no means restricted thereto.

The ratio of the total amount of isocyanate groups to the total amount of hydroxyl groups of the polymer (pP), will be referred to as NCO/OH.

The molecular weight and the molecular weight distribution were measured by Gel permeation chromatography (standard: polystyrene).

The hydroxyl value (mg·KOH/g) was measured in accordance with JIS K1557.

The analysis by a Fourier transform infrared spectrophotometer was carried out by a transmission method using a KBr plate.

The analysis by NMR was carried out by measurements of $^1$H-NMR (300 MHz) and $^{13}$C-NMR (75 MHz) using deuterium acetone and deuterium chloroform, respectively, as solvents.

PREPARATION EXAMPLE

Preparation Example for Polymer (P)

Preparation Example 1

Preparation Example for Polymer (P-1)

In the presence of zinc hexacyanocobaltate having glyme as a ligand, ring-opening polymerization of polyoxypropylene diol (Mn=1,000) with propylene oxide was carried out to obtain polyoxyalkylene diol (Mn=16,000, hydroxyl value: 7.7) (polymer (pP-1)). Then, into a pressure-proof reactor (internal volume: 5 L), 3,000 g of the polymer (pP-1) was introduced, and it was dehydrated under reduced pressure while maintaining the internal temperature at 110° C.

Then, the air inside the reactor was replaced with nitrogen gas, and 86.1 g of Si(—OCH$_3$)$_3$(—CH$_2$CH$_2$CH$_2$NCO) (compound (U-1), purity: 95%) was added to adjust NCO/OH to be 0.97, while maintaining the internal temperature at 80° C. for 8 hours. The product was analyzed by a Fourier transform infrared spectrophotometer, and termination of the reaction of hydroxyl groups and isocyanate groups was confirmed. Further, when the content of NCO was measured, it was undetected. The content inside the reactor was further analyzed by NMR and Gel permeation chromatography, whereby the formation of a polymer (Mn=16,100, Mw/Mn=1.38) (polymer (P-1)) having an urethane bond, a polyoxypropylene chain and a trimethoxy silyl group, was confirmed.

Preparation Example 2

Preparation Example for Polymer (P-2)

A polymer (Mn=16,300, Mw/Mn=1.35) (polymer (P-2)) having a polyoxypropylene chain and a —Si(OCH$_3$)$_3$ group, was obtained in the same manner as in Preparation Example 1, except that the urethane-forming reaction was carried out by using 77.2 g of the compound (U-1) to adjust NCO/OH to be 0.87.

Preparation Example 3

Preparation Example for Polymer (P-3)

In the presence of zinc hexacyanocobaltate having tert-butyl alcohol as a ligand, ring-opening polymerization of polyoxypropylene diol (Mn=1,000) with propylene oxide was carried out to obtain polyoxyalkylene diol (Mn=10,000, hydroxyl value: 11.2) (polymer (pP-3)). Then, into a pressure-proof reactor (internal volume: 5 L), 3,000 g of the polymer (pP-3) was introduced, and it was dehydrated under reduced pressure while maintaining the internal temperature at 110° C.

Then, the air inside the reactor was replaced with nitrogen gas, and 125.2 g of the compound (U-1) was added to adjust NCO/OH to be 0.97, while maintaining the internal temperature at 50° C. Then, an urethane-forming reaction of the polymer (pP-3) with the compound (U-1) was carried out while maintaining the internal temperature at 80° C. for 8 hours. The termination of the reaction was confirmed in the same manner as in Preparation Example 1, and as a result of an analysis of the content inside the reactor, the formation of a polymer (Mn=10,800, Mw/Mn=1.15) (polymer (P-3)) having an urethane bond, a polyoxypropylene chain and a trimethoxy silyl group, was confirmed.

Preparation Example 4

Preparation Example for Polymer (P-4)

A polymer (Mn=16,800, Mw/Mn=1.42) (polymer (P-4)) having an urethane bond, a polyoxypropylene chain and a trimethoxy silyl group, was obtained in the same manner as in Preparation Example 1, except that the urethane-forming reaction was carried out by using 97.6 g of the compound (U-1) to adjust NCO/OH to be 1.10.

Preparation Example 5

Preparation Example of Polymer (P-5)

A polymer (Mn=16,600, Mw/Mn=1.35) (polymer (P-5)) having an urethane bond, a polyoxypropylene chain and a trimethoxy silyl group, was obtained in the same manner as in Preparation Example 1, except that the urethane-forming reaction was carried out by using 62.1 g of the compound (U-1) to adjust NCO/OH to be 0.70.

Preparation Example 6

Preparation Example for Polymer (P-6)

In the presence of zinc hexacyanocobaltate having glyme as a ligand, ring-opening polymerization of polyoxypropylene diol (Mn=1,000) with propylene oxide was carried out to obtain polyoxyalkylene diol (Mn=16,000, hydroxyl value: 7.4) (polymer (pP-6)). Then, into a pressure-proof reactor (internal volume: 5 L), 3,000 g of the polymer (pP-6) was introduced, and it was dehydrated at 110° C. for 2 hours under reduced pressure.

Then, the air inside the reactor was replaced with nitrogen gas, and 82.8 g of the compound (U-1) was added to adjust NCO/OH to be 0.97, while maintaining the internal temperature at 50° C., and after the temperature was raised to 80° C., the mixture was reacted for 8 hours with stirring. The termination of the reaction was confirmed in the same manner as in Preparation Example 1, and as a result of an analysis of the content inside the reactor, the formation of a polymer (Mn=17,000, Mw/Mn=1.4) (polymer (P-6)) having an urethane bond, a polyoxypropylene chain and a trimethoxy silyl group, was confirmed.

Examples 1 to 9

Preparation Examples for Curable Compositions 1 to 9

By suitably using polymers (P-1) to (p-5) as the polymer (P), Si(—OCH$_3$)$_3$(—CH$_2$CH$_2$CH$_2$SH) (hereinafter referred to as compound (S-1)) or Si(—OCH$_3$)$_2$(—CH$_3$)(—CH$_2$CH$_2$CH$_2$SH) (hereinafter referred to as compound (S-2)), as the compound (S), and Si(—OCH$_3$)$_3$(—CH=CH$_2$) (hereinafter referred to as compound (V-1)) as the compound (V), they were mixed as shown in the following Table 1, to obtain curable compositions 1 to 9.

TABLE 1

| Ex. | | Polymer (P) (parts by mass %) | Compound (S) (parts by mass %) | Compound (V) (parts by mass %) |
|---|---|---|---|---|
| 1 | Curable composition (1) | Polymer (P-1) (100) | Compound (S-1) (0.06) | |
| 2 | Curable composition (2) | Polymer (P-1) (100) | Compound (S-1) (0.02) | |
| 3 | Curable composition (3) | Polymer (P-1) (100) | Compound (S-1) (0.10) | |
| 4 | Curable composition (4) | Polymer (P-1) (100) | Compound (S-1) (0.06) | |
| 5 | Curable composition (5) | Polymer (P-3) (100) | Compound (S-1) (0.06) | |
| 6 | Curable composition (6) | Polymer (P-2) (100) | Compound (S-1) (0.06) | |
| 7 | Curable composition (7) | Polymer (P-1) (100) | Compound (S-1) (0.06) | Compound (V-1) (1.00) |
| 8 | Curable composition (8) | Polymer (P-4) (100) | Compound (S-1) (0.06) | |
| 9 | Curable composition (9) | Polymer (P-5) (100) | Compound (S-1) (0.06) | |

Comparative Example

Preparation Example for Comparative Curable Compositions 1 to 4

By suitably using the polymer (P-1) or the polymer (P-3) as the polymer (P), and the compound (S-1) or dodecyl mercaptan, as the compound (S), they were mixed as shown in the following Table 2 to obtain comparative curable compositions 1 to 4.

TABLE 2

| Comp. Ex. | | Polymer (P) (parts by mass %) | Compound (S) (parts by mass %) |
|---|---|---|---|
| 1 | comparative curable composition (1) | Polymer (P-1) (100) | |
| 2 | comparative curable composition (2) | Polymer (P-1) (100) | Compound (S-1) (1.00) |
| 3 | comparative curable composition (3) | Polymer (P-3) (100) | |
| 4 | comparative curable composition (4) | Polymer (P-1) (100) | Dodecyl mercaptan (0.06) |

EVALUATION EXAMPLE

Evaluation Example for Physical Properties of Curable Compositions

Evaluation Example 1

Measurement of Viscosity Increase of Curable Compositions

Measurements of viscosity increase of the curable compositions 1 to 9 and comparative curable compositions 1 to 4, were carried out.

The viscosity increase was measured by using a B-type viscometer (rotor used: No. 6, measurement temperature: 25° C., rotational speed: 10.5 rpm). The initial viscosity (Pa·s) represents a viscosity of a curable composition immediately after it was prepared, the later viscosity (Pa·s) represents a viscosity of a curable composition after it was stored for 1 week at 80° C., and the viscosity increase represents a % value of (latter viscosity−initial viscosity)/initial viscosity. The results are shown in Table 3.

Evaluation Example 2

Tensile Shearing Test for Blended Composition

To 100 parts by mass of the curable composition 1, 75 parts by mass of surface-treated calcium carbonate (manufactured by SHIRAISHI CALCIUM KAISHA, LTD., tradename: HAKUENKA CCR) as a filler, 75 parts by mass of deuterium calcium carbonate (manufactured by SHIRAISHI CALCIUM KAISHA, LTD., tradename: WHITON SB) as a filler, 40 parts by mass of bis-2-ethyl hexyl phthalate as a plasticizer and 3 parts by mass of hydrogenated castor oil (manufactured by Kusumoto Chemicals Ltd., tradename: DISPARLON 6500) as a thixotropy-imparting agent were added, followed by stirring and mixing by a planetary stirrer (manufactured by KURABO INDUSTRIES LTD.). Then, after the temperature was lowered to 25° C., 1 part by mass of 3-glycidyloxypropyltrimethoxysilane (manufactured by Shin-Etsu Chemical Co., Ltd., tradename: KBM-403) and a proper amount of the compound (V-1) were suitably added, followed by stirring and mixing. Then, 1 part by mass of dibutyltin laurate as a curing catalyst was added, followed by stirring and mixing to obtain a blended composition 1.

Blended compositions 2 to 9 and comparative blended compositions 1 to 4 were obtained in the same manner, except that the curable compositions 2 to 9 or the comparative curable compositions 1 to 4 were used instead of the curable composition 1.

A tensile shearing test was carried out with respect to each of the blended compositions 1 to 9 and the comparative blended compositions 1 to 4.

The tensile shearing test was carried out in accordance with JIS K6850. Specifically, by using a blended composition, two anodized aluminum plates were bonded to face each other through a spacer, and it was cured and aged for 7 days at 23° C. under a humidity of 50%. Then, the spacer was removed, followed by curing for 7 days at 50° C. under a humidity of 50%. Further, after it was left for more than 24 hours at 23° C. under a humidity of 50%, the 50% tensile stress (N/mm$^2$) (hereinafter referred to as M50), the tensile stress (N/mm$^2$) (hereinafter referred to as Tmax), and the elongation (%) (hereinafter referred to as E) under the maximum stress, were measured by using a TENSILON testing instrument (manufactured by A & D Co. Ltd, tradename: series RTA-1T). The results are shown in Table 3.

Evaluation Example 3

Test of Surface Tackiness of Blended Composition

Tests of surface tackiness of the blended compositions 1 to 9 and the comparative blended compositions 1 to 4 were carried out.

The test of surface tackiness was carried out in accordance with JIS A1439. Specifically, when a surface of a cured product obtained by curing a blended composition was touched with a finger, the time until the cured product no longer sticked to the finger, was measured as the tacking free time (min). The results are shown in Table 3.

polymer (P-1), the polymer (P-2) or the polymer (P-3) was used as the polymer (P) in the above curable composition, the curable composition is particularly excellent in storage stability.

Further, it is evident that the blended compositions prepared from the above curable compositions have a short tacking free time and fast curability, and their 50% tensile stress, tensile stress, and elongation under the maximum stress are high, whereby cured products having excellent mechanical strength are formed.

Example 10

Preparation Example for Curable Composition Having Chromaticity Less than 100

Into a pressure-proof reactor, 1,000 g of the polymer (P-6) obtained in Preparation Example 1 and 5 g of pentaerythritol tetrakis[3-(3,5-ditert-butyl-4-hydroxyphenyl)propionate] (manufactured by Ciba Specialty Chemicals Inc., IRGANOX 1010, hereinafter referred to as compound (T-1)) as a hindered phenol type antioxidant (T), were added, and in a nitrogen atmosphere, the compound (T-1) was dissolved with stirring for 2 hours at 90° C. Then, 0.6 g of the compound (S-1) was added thereto, followed by stirring for 1 hour to obtain a curable composition 10.

Comparative Example 5

Preparation Example for Curable Composition Having High Chromaticity

Into a pressure-proof reactor, 1,000 g of the polymer (P-1) obtained in Preparation Example 1, 5 g of the compound (T-1)

TABLE 3

| | | Initial viscosity | later viscosity | viscosity increase | tacking free time | M50 | Tmax | E |
|---|---|---|---|---|---|---|---|---|
| Ex. 1 | Blended composition (1) | 20.2 | 20.3 | 0 | 73 | 0.33 | 1.11 | 475 |
| Ex. 2 | Blended composition (2) | 20.1 | 20.8 | 3 | 73 | 0.33 | 1.10 | 471 |
| Ex. 3 | Blended composition (3) | 20.5 | 20.4 | 0 | 75 | 0.34 | 1.18 | 474 |
| Ex. 4 | Blended composition (4) | 20.2 | 20.6 | 2 | 73 | 0.32 | 1.09 | 471 |
| Ex. 5 | Blended composition (5) | 7.8 | 7.9 | 1 | 60 | 0.82 | 1.28 | 116 |
| Ex. 6 | Blended composition (6) | 19.0 | 19.2 | 1 | 75 | 0.26 | 0.95 | 502 |
| Ex. 7 | Blended composition (7) | 18.6 | 18.6 | 0 | 72 | 0.32 | 1.09 | 478 |
| Ex. 8 | Blended composition (8) | 20.0 | 25.1 | 26 | 74 | 0.41 | 1.31 | 266 |
| Ex. 9 | Blended composition (9) | 18.5 | 25.0 | 35 | 77 | 0.18 | 0.78 | 562 |
| Comp. Ex. 1 | Comparative blended composition (1) | 20.5 | 32.0 | 56 | 70 | 0.30 | 1.14 | 477 |
| Comp. Ex. 2 | Comparative blended composition (2) | 20.4 | 20.3 | 0 | 168 | 0.36 | 1.19 | 471 |
| Comp. Ex. 3 | Comparative blended composition (3) | 7.7 | 12.2 | 58 | 57 | 0.80 | 1.26 | 116 |
| Comp. Ex. 4 | Comparative blended composition (4) | 20.6 | 25.0 | 21 | 101 | 0.20 | 0.93 | 532 |

From the above results, it is evident that the curable compositions 1 to 9 containing specific amounts of the polymer (P) and the compound (S) have a low viscosity increase and excellent storage stability. Further, it is evident that when the and 0.6 g of the compound (S-1) were simultaneously added. With stirring for 3 hours at 90° C., the compound (T-1) was dissolved, and at the same time, the compound (S-1) was mixed, to obtain the comparative curable composition 5.

Evaluation Example

Evaluation of Chromaticity 50 g each of the curable composition 10 and the comparative curable composition 5, obtained in Example 10 and Comparative Example 5 respectively, was transferred into a 50 ml glass bottle and stored at 80° C. for 4 hours. The chromaticity was measured at the initial stage and after 4 hours of storage. The chromaticity was measured in accordance with JIS K1557. The results are shown in

TABLE 4

| | | chromaticity (initial) | chromaticity (after 4 hours) |
|---|---|---|---|
| Example 10 | Curable composition (10) | Less than 10 | Less than 10 |
| Comparative Example 5 | Comparative curable composition (5) | 100 | 120 |

From the above results, with respect to the comparative curable composition 5 wherein the antioxidant (T) and the compound (S) were simultaneously added and dissolved, the chromaticity after the preparation is high, and the chromaticity tends to increase after storage. On the other hand, with respect to the curable composition 10 wherein the antioxidant (T) was dissolved, and then the compound (S) was added, coloration after the preparation was hardly recognized, and the chromaticity did not tend to increase after storage.

It is evident that the curable composition 10 has excellent appearance.

INDUSTRIAL APPLICABILITY

The curable composition of the present invention is a curable composition which is capable of forming a cured product having excellent mechanical strength, and which has fast curing properties, excellent storage stability and also excellent appearance.

The curable composition of the present invention is useful as an adhesive to be used in the field of e.g. a sealing material (such as an elastic sealing material sealant for building or a sealing material for multi-layer glass), sealant (such a sealant for rust prevention•waterproof of glass ends or a sealant for a rear side of a solar cell), or an electrical insulating material (an insulating coating for wire•cable). Further, the curable composition of the present invention may be used as an adhesive, a coating material, a film material, a gasket material or a casting material.

The entire disclosure of Japanese Patent Application No. 2005-372292 filed on Dec. 26, 2005 including specification, claims and summary is incorporated herein by reference in its entirety.

What is claimed is:

1. A curable composition which comprises a polymer (P) having polyoxyalkylene formed by ring-opening polymerization of a $C_{2-6}$ alkylene oxide and a group of the following formula (1), and a compound (S) having the following formula (S1), and which contains from 0.01 to 0.50 part by mass of the compound (S) per 100 parts by mass of the polymer (P):

$$—Si(—X^1)_3 \quad (1)$$

$$Si(—X^2)_m(—Y^2)_{3-m}(\text{-}Q^M\text{-SH}) \quad (S1)$$

wherein symbols have the following meanings:
$X^1$ and $X^2$: each independently a $C_{1-6}$ alkoxy group,
$Y^2$: a $C_{1-6}$ alkyl group,
m: 1, 2 or 3, and
$Q^M$: a $C_{1-20}$ divalent organic group, and
wherein the polymer (P) has a number average molecular weight (Mn) of from 5,000 to 30,000 and a molecular weight distribution (Mw/Mn) of at most 3.0.

2. The curable composition according to claim 1, wherein the polymer (P) is a polymer (P1) obtained by an urethane-forming reaction of a polymer (pP) having a polyoxyalkylene chain and a hydroxy group, with a compound (U) having a group of the following formula (1) and an isocyanate group, and in the urethane-forming reaction, the ratio of the total number of isocyanate groups in the compound (U) to the total number of hydroxy groups in the polymer (pP) is from 0.80 to 1.50:

$$—Si(—X^1)_3 \quad (1)$$

wherein symbol has the following meaning:
$X^1$: a $C_{1-6}$ alkoxy group.

3. The curable composition according to claim 2, wherein the compound (U) is a compound of the following formula (U1):

$$Si(—X^1)_3(\text{-}Q^U\text{-NCO}) \quad (U1)$$

wherein symbols have the following meanings:
$X^1$: a $C_{1-6}$ alkoxy group, and
$Q^U$: a $C_{1-20}$ divalent organic group.

4. The curable composition according to claim 1, which further contains a compound of the following formula (V):

$$Si(—X^3)_n(—Y^3)_{4-n} \quad (V)$$

wherein symbols have the following meanings:
$X^3$: a $C_{1-6}$ alkoxy group,
$Y^3$: a $C_{1-6}$ hydrocarbon group, and
n: 1, 2, 3 or 4.

5. An adhesive or sealing material using the curable composition as defined in claim 1.

6. The curable composition according to claim 1, wherein said ring-opening polymerization is in the presence of a double metal cyanide complex.

7. The curable composition according to claim 1, wherein compound (S) is present in a maximum amount of 0.06 part by mass of the compound (S) per 100 parts by mass of the polymer (P).

8. A curable composition which comprises a polymer (P) having polyoxyalkylene formed by ring-opening polymerization of a $C_{2-6}$ alkylene oxide and a group of the following formula (1), a compound (S) having the following formula (S1), and an antioxidant (T), and which contains from 0.01 to 0.50 part by mass of the compound (S) and from 0.01 to 10 parts by mass of the antioxidant (T), per 100 parts by mass of the polymer (P):

$$—Si(—X^1)_3 \quad (1)$$

$$Si(—X^2)_m(—Y^2)_{3-m}(\text{-}Q^m\text{-SH}) \quad (S1)$$

wherein symbols have the following meanings:
$X^1$ and $X^2$: each independently a $C_{1-6}$ alkoxy group,
$Y^2$: a $C_{1-6}$ alkyl group,
m: 1, 2 or 3, and
$Q^M$: a $C_{1-20}$ divalent organic group, and
wherein the polymer (P) has a number average molecular weight (Mn) of from 5,000 to 30,000 and a molecular weight distribution (Mw/Mn) of at most 3.0.

9. The curable composition according to claim 8, which has a chromaticity of less than 100.

10. The curable composition according to claim 8, wherein said ring-opening polymerization is in the presence of a double metal cyanide complex.

11. The curable composition according to claim 8, wherein compound (S) is present in a maximum amount of 0.06 part by mass of the compound (S) per 100 parts by mass of the polymer (P).

12. A curable composition which is a curable composition obtained by adding and mixing an antioxidant (T) to a polymer (P) having polyoxyalkylene formed by ring-opening polymerization of a $C_{2-6}$ alkylene oxide and the group of the following formula (1), and then adding and mixing a compound (S) having the following formula (S1) thereto, and which contains from 0.01 to 0.50 part by mass of the compound (S) and from 0.01 to 10 parts by mass of the antioxidant (T), per 100 parts by mass of the polymer (P):

     (1)

     (S1)

wherein symbols have the following meanings:
$X^1$ and $X^2$: each independently a $C_{1-6}$ alkoxy group,
$Y^2$: a $C_{1-6}$ alkyl group,
m: 1, 2 or 3, and
$Q^M$: a $C_{1-20}$ divalent organic group, and
wherein the polymer (P) has a number average molecular weight (Mn) of from 5,000 to 30,000 and a molecular weight distribution (Mw/Mn) of at most 3.0.

13. The curable composition according to claim 12, which has a chromaticity of less than 100.

14. The curable composition according to claim 12, wherein said ring-opening polymerization is in the presence of a double metal cyanide complex.

15. The curable composition according to claim 12, wherein compound (S) is present in a maximum amount of 0.06 part by mass of the compound (S) per 100 parts by mass of the polymer (P).

* * * * *